United States Patent
Coulas et al.

(10) Patent No.: US 7,634,074 B2
(45) Date of Patent: Dec. 15, 2009

(54) METHOD AND APPARATUS FOR MAKING SIDEBAR CALLS

(75) Inventors: Michael F. Coulas, Buffalo Grove, IL (US); Matthew J. Bonness, Chicago, IL (US); Valentin Oprescu-Surcobe, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 751 days.

(21) Appl. No.: 11/241,175

(22) Filed: Sep. 30, 2005

(65) Prior Publication Data

US 2007/0091830 A1 Apr. 26, 2007

(51) Int. Cl.
*H04M 3/42* (2006.01)
(52) U.S. Cl. .................. 379/202.01; 370/261; 709/204; 709/227
(58) Field of Classification Search ............ 379/202.01; 370/261; 709/204, 227
See application file for complete search history.

(56) References Cited

U.S. PATENT DOCUMENTS

| | | | | |
|---|---|---|---|---|
| 6,404,873 | B1 * | 6/2002 | Beyda et al. | 379/202.01 |
| 6,438,111 | B1 * | 8/2002 | Catanzaro et al. | 370/260 |
| 2003/0035527 | A1 | 2/2003 | Baker | |
| 2005/0259803 | A1 * | 11/2005 | Khartabil | 379/202.01 |

FOREIGN PATENT DOCUMENTS

EP 1006706 A2 6/2000

OTHER PUBLICATIONS

R. Sparks, "The Session Initiation Protocol (SIP) Refer Method", IETF Standard, Internet Engineering Task Force, IETF, CH, Apr. 2003, Sections 1 and 2, Section 2.4.3.

* cited by examiner

*Primary Examiner*—Quynh H Nguyen
(74) *Attorney, Agent, or Firm*—Gary J. Cunningham

(57) ABSTRACT

A method and apparatus for conducting a sidebar, subconference call from a multiparty conference call is provided. Once a party has joined a multiparty conference call, the party is able to initiate the subconference call by transmitting a session initiation protocol (SIP) command to a target party. Two SIP commands that may be employed to initiate the subconference call are the REFER command and the INVITE command. To allow the target party to distinguish between incoming communication requests related to the multiparty conference call from extraneous ones, the REFER or INVITE command includes at least one data field containing an identifier of the conference call referred the REFER or INVITE command. Once received and verified, the target party may respond accordingly to establish the subconference call. The target party's handset may reference data fields in the SIP command to those locally stored and known to be associated with the multiparty conference call. Where recognized, the handset may present the communication request to the target party along with an option to accept the communication request.

13 Claims, 7 Drawing Sheets

300

```
REFER SIP : USERB_PUBLIC@HOMEB.NET SIP/2.0

VIA : SIP/2.0/UDP 192.0.2.3:1357; COMP = SIGCOMP;
BRANCH=Z9HG4BKNASHDS7

MAX - FORWARDS : 70

ROUTE : <SIP : PCSCFA.VISITEDA.NET : 7351 ; 1R ; COMP = SIGCOMP>

ROUTE : <SIP : ORIG@SCSCFA.HOMEA.NET ; 1R>

P - PREFERRED - IDENTITY : <SIP : USERA_PUBLICA@HOMEA.NET>

P - ACCESS - NETWORK - INFO : (IP - CAN SPECIFIC ACCESS NETWORK INFO)

PRIVACY : NONE

FROM : <SIP : USERA_PUBLICA@HOMEA.NET> ; TAG = 31415 — 303

TO : <SIP : USERB_PUBLICB@HOMEB.NET> — 302

CALL - ID : B89RJHNEDLRFJFLSJ40A222

CSEQ : 130 REFER

REQUIRE : SEC - AGREE

PROXY - REQUIRE : SEC - AGREE

SECURITY - VERIFY : IPSEC - 3GPP ; Q = 0.1; ALG = HMAC - SHA - 1 - 96;
SPI - C = 98765432; SPI - S = 87654321 ; PORT - C = 8642 ; PORT - S = 3542

CONTACT : <SIP : 192.0.2.3 ; 1357 ; COMP = SIGCOMP>

REFER - TO : <SIP : USERA_PUBLIC@HOMEA.NET ; METHOD = INVITE> — 304

REFERRED - BY : <SIP : CONFERENCE001@MRFC1.HOME1.NET> — 301

CONTENT - LENGTH : (...)      ⎫
                              ⎪
V = 0                         ⎬ — 305
                              ⎪
C = IN IP4 192.0.2.3          ⎪
                              ⎪
M = AUDIO 3456 RTP / AVP 96 97 0  ⎭
               •
               •
               •
```

```
INVITE SIP : USERB_PUBLIC@HOMEB.NET SIP/2.0

VIA : SIP/2.0/UDP 192.0.2.3:1357; COMP = SIGCOMP;
BRANCH=Z9HG4BKNASHDS7

MAX - FORWARDS : 70

ROUTE : <SIP : PCSCFA.VISITEDA.NET : 7351 ; 1R ; COMP = SIGCOMP>

ROUTE : <SIP : ORIG@SCSCFA.HOMEA.NET ; 1R>

P - PREFERRED - IDENTITY : <SIP : USERA_PUBLICA@HOMEA.NET>

P - ACCESS - NETWORK - INFO : (IP - CAN SPECIFIC ACCESS NETWORK INFO)

PRIVACY : NONE

FROM : <SIP : USERA_PUBLICA@HOMEA.NET> ; TAG = 31415 — 503

TO : <SIP : USERA_PUBLICB@HOMEB.NET> — 502

CALL - ID : B89RJHNEDLRFJFLSJ40A222

CSEQ : 127 INVITE

REQUIRE : SEC - AGREE

PROXY - REQUIRE : SEC - AGREE

SUPPORTED : 100REL

SECURITY - VERIFY : IPSEC - 3GPP ; Q = 0.1; ALG = HMAC - SHA - 1 - 96;
SPI - C = 98765432; SPI - S = 87654321 ; PORT - C = 8642 ; PORT - S = 3542

CONTACT : <SIP : 192.0.2.3 : 1357 ; COMP = SIGCOMP>

ALLOW : INVITE, ACK, CANCEL, BYE, PRACK, UPDATE, REFER, NOTIFY — 504

REFERRED - BY : <SIP : CONFERENCE001@MRFC1.HOME1.NET> — 501

CONTACT - TYPE : APPLICATION/SDP  ⎫
CONTACT - LENGTH:(...)                        ⎬ — 505
C = IN IP4 192.0.2.3                              ⎪
M = AUDIO 3456 RTP / AVP 96 97 0        ⎭
```

METHOD AND APPARATUS FOR MAKING SIDEBAR CALLS

BACKGROUND

1. Technical Field

This invention relates generally to a method and apparatus for making sidebar calls in parallel with conference calls, and more particularly to a method and apparatus for making private, parallel sidebar calls using session initiation protocol commands.

2. Background Art

Business is becoming more and more seamless due to advances in technology. Until recently, people had to travel to offices and factories each and every day to conduct business. They had to travel by car, boat, plane and train to meet with clients, customers and vendors. To run a global business, one had to log many hours and many miles on the road.

With the advent of electronic communication technology, however, the world has become a smaller place. New electronic devices like computers, mobile telephones and pagers allow people to stay in touch with customers, suppliers and their offices regardless of their physical location. Inexpensive long distance and the rise of the Internet allow telecommuting and nearly instant communications across the globe. Where a virtual "tether" once existed between a businessperson and his desk, he is now able to conduct business while traveling or even while on vacation.

Despite these technological advances, however, some people feel they still have to travel to properly conduct business. This perceived need exists because some of the options and flexibilities of meeting in person are not matched with a technological interface. One such example is the caucus, or side bar conversation, that takes place in a group meeting.

When people meet face to face, perhaps in a conference room for a negotiation, the various parties are able to communicate directly to discuss the terms of a deal or merger. When two people want to have a private discussion away from the group, for example to discuss the pros and cons of a particular proposal, they simply step into another room or office and talk. After talking in private, they are able to rejoin the group meeting feeling assured that they have the same understanding on that particular issue. They are also assured that the other party has not been privy to their conversation.

When using a multiparty teleconference in place of the face-to-face meeting, these sidebars are almost impossible to conduct. By way of example, if two people from company A are talking with two people from company B, where each person is calling from a different state or country, it is all but impossible to have a sidebar conversation. Where all the parties have dialed into a central conference number, the two parties must each hang up the conference call connection, call each other, talk and the redial the central conference number.

One prior art solution to this problem is for the people calling in to all subscribe to multiple phone lines. Where this is the case, the parties may each put the teleconference being conducted on line 1 on hold, both connect to a second line, dial each other, talk, hang up line 2 and then rejoin the conference call on line 1.

The problem with this prior art method is that it is both cumbersome and expensive. It first requires all of the parties who may desire a sidebar to have multiple line telephones. Further, they have to execute a large number of steps to have both lines going at the same time. Finally, should the second line ring while the teleconference is ongoing, the recipient of the call has no way of knowing whether the incoming call is related to the conference call unless someone announces the intent of holding a sidebar call to the entire group. For large, multiparty calls, such an announcement may be both distracting and of little benefit to the group.

Further complicating matters, the callers may be calling into the conference from mobile telephones. While some existing mobile telephone standards and protocols, for example IMS standards, do allow multiparty calls, they make no provision for splitting out of an existing multiparty call to conduct a subconference call.

There is thus a need for an improved method and apparatus for initiating and conducting sidebar, subconference calls in parallel with a multiparty conference call.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 illustrates one embodiment of a REFER command in accordance with the invention.

FIG. 5 illustrates one embodiment of an INVITE command in accordance with the invention.

Figure 1:
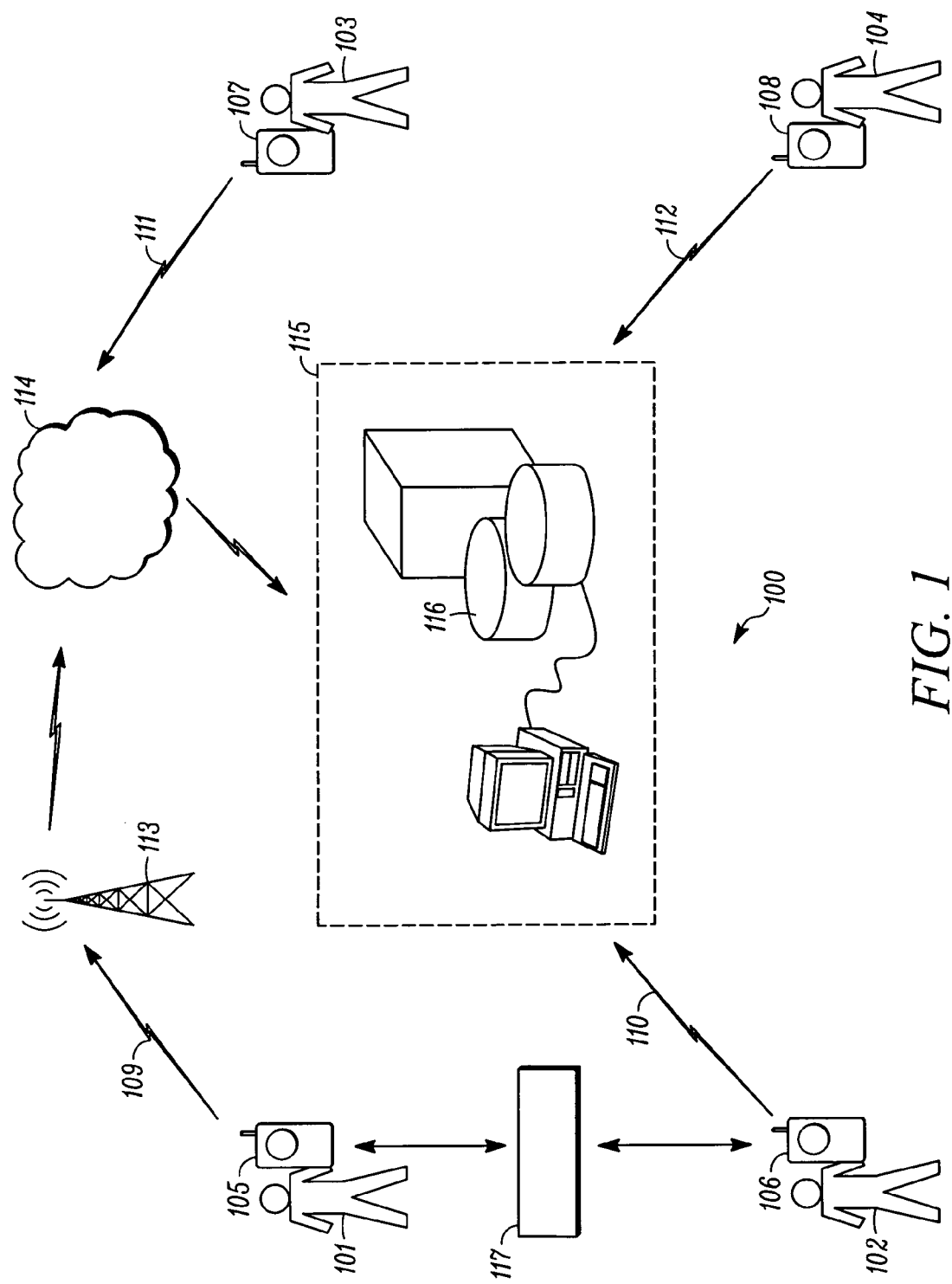
FIG. 1 illustrates a system and infrastructure suitable for accommodating subconference calls from multiparty conference calls in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to initiating and conducting sidebar, subconference calls in parallel with multiparty conference calls using session initiation protocol (SIP) commands. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of initiating and conducting sidebar calls using SIP protocol commands described herein. The non-processor circuits may include, but are not limited to, a radio receiver, a radio transmitter, signal drivers, clock circuits, power source circuits, memory circuits and user input devices. As such, these functions may be interpreted as steps of a method to perform initiation and handling of sidebar calls with SIP commands. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

The invention described herein teaches a method for using session initiation protocol (SIP) commands to initiate and conduct sidebar, or subconference, calls in parallel with multiparty conference calls. The use of SIP commands to split subconference calls from multiparty conference calls is well suited for implementation in systems utilizing the Global Systems for Mobile Communications (GSM) standards, the UMTS standards, the cdma2000 family of standards (for example 1XevDV, HRPD) and Wireless Local Area Network (WLAN) system standards.

In one embodiment of the invention, a method and apparatus are provided for initiating a subconference call by using a SIP REFER command. The details of some SIP commands and their usage are recited by the 3rd Generation Partnership Project (3GPP) Technical Specification Group Services and System Aspects MultiParty (MPTY) Supplementary Services technical specification 3GPP TS 22.084, which is incorporated herein by reference. The details of the SIP REFER command are outlined in 3GPP RFC 3892 and 3GPP2 X.S0013, which are incorporated herein by reference.

This embodiment is most easily visualized by way of the following example. Presume that there is a conference call between four parties, A, B, C and D. Also presume that at sometime during the four-way call, party A and party B desire to have a subconference call privately between themselves. Using the SIP REFER command, this would occur as follows:

Party A in the conference call sends a SIP REFER command from his handset to the handset of party B, who is the party he would like to split out of the conference with to create a separate, parallel call. In accordance with the standard specifications relating to the REFER command, the REFER command includes a data field indicating to whom the SIP REFER command is to be directed. This data field is populated with party B's identifying characteristics, which may be his telephone number, handset identifier, uniform resource indicator (URI), uniform resource locater (URL) or Subscriber Identity Module (SIM) card identifier.

The REFER command also includes a data field listing party A's URI, which indicates the method of responding to the REFER command. This data field is set to INVITE, indicating that party B may accept the REFER command request to enter a subconference call by transmitting an INVITE command.

The REFER command further includes another data field that indicates from whom the REFER command was referred. In one embodiment, this data field is populated with an identifier of the conference call. This data field is very useful, as party B may have his handset set so as to reject incoming calls while he is engaged in the multiparty conference call. With the data field indicating from whom the REFER command was referred, further indicating that the conference is the referring party, party B is able to identify that the REFER command, and thus the resulting subconference call, relates to the multiparty conference call. This data field therefore provides context for the subconference call, indicating that the REFER command came from a member of the conference call, and not a random, non-participatory party.

Upon receipt of the REFER command, party B's handset may read these data fields and verify that the incoming request is related to the multiparty conference call. As the incoming URI in this example was set to INVITE, party B accepts the request to join the subconference call by transmitting an INVITE command back to party A. When party A accepts the INVITE command, both party A and party B may temporarily place the conference call on hold and conduct their subconference call.

Identification of the conference and participants may be provided to the handsets of the parties through subscription services. For example, the parties may subscribe to a conference event package that allows their handset set monitor conference calls, including the identities of the conference bridge and participants. This information enables them to know which parties are available to participate in subconference splits. It also allows the parties to verify that the initiator of a subconference split request is a participant in the conference call.

In one embodiment, to better alert users that subconference calls are occurring, audiovisual alerts, including lights, sounds or on-screen messages (similar to used for conventional call waiting) may be provided to the user. These audiovisual alerts may prompt a party that a subconference request has been received, and may offer them the option of accepting or rejecting the request.

In an alternate embodiment, the subconference call is initiated by transmission of an INVITE command directly. Continuing with the presumptions set forth above, party A may initiate a subconference call by directly sending an INVITE command to party B, thereby saving the need of the extra REFER request.

As with the REFER command, the INVITE command includes at least one data field that indicates from whom the INVITE command was referred. In accordance with the invention, this data field is populated with a conference identifier, thereby alerting party B that the subconference call is related to the multiparty conference call. Where party B accepts the INVITE command, both parties may place the multiparty conference call on hold and then complete the subconference call.

Turning now to FIG. 1, illustrated therein is one embodiment of an infrastructure configuration, system and devices compatible with establishing a subconference call in accordance with the invention. In the system, multiple parties 101-104, each having a handset 105-108, join a multiparty conference call. The handsets 105-108 may be mobile radiotelephones, for example, or they may be more conventional telephones that communicate across a data network, like a Linux-based WLAN for instance. Note also that while four parties 101-104 are shown in this illustrative embodiment, it will be clear to those of ordinary skill in the art having the benefit of this disclosure that any number of parties may be accommodated by the invention.

Each party's handset 105-108 joins the teleconference by establishing a telecommunication 109-112 with a conference host 115. The telecommunication path may be any of a variety of forms known in the art. For example, a first party 101 may have a handset 105 that establishes a telecommunication link 109 first with a mobile services tower 113 and then through a more traditional switched network 114. A second party 103 may have a handset 107 that establishes a communication link 111 directly with a switched telephone or data network 114, while other handsets 106,108 may take additional routes 110, 112 to the conference host. The communication paths 109-112 of FIG. 1 are to be illustrative only.

The conference host 115, which is a conference bridge in one embodiment, is a central hosting component that facilitates the multiparty conference call. While the conference host 115 may take many forms, including a dedicated server capable of networking telecommunication links, a cellular or conventional telephone services provider, a central exchange or PBX with a multiparty dial-in number and access ID or other suitable links as are known in the art, in one embodiment, the conference host 115 is known as a conference bridge having a telecommunications networking server 116 capable of handling multiparty calls. As such, the conference host 115 will be referred to herein as the "conference bridge" for discussion purposes.

The conference bridge 115 includes at least a conference identifier. This conference identifier may be as simple as the conference telephone number. Alternatively, the conference identifier could be a unique alphanumeric code. The conference identifier may also be a unique URI identifying the conference bridge.

When the parties 101-104 have all joined the multiparty call, the invention provides a mechanism for establishing a private, parallel, sidebar or subconference call. As will be described in detail below, a first party, e.g. party 101, may initiate a call by sending a SIP command 117 to a second party 102. The SIP command 117, be it a REFER command or INVITE command, includes at least one data field indicating that the conference bridge 115 is the entity from whom the SIP command 117 was referred. This reference to the conference bridge 115 allows the receiving party's handset 106 to determine that the subconference call is related to the multiparty conference call. The handset 106 may therefore provide the user 102 with the option of accepting the subconference call. Where the recipient 102 accepts the request, the subconference call may be established.

Figure 2:
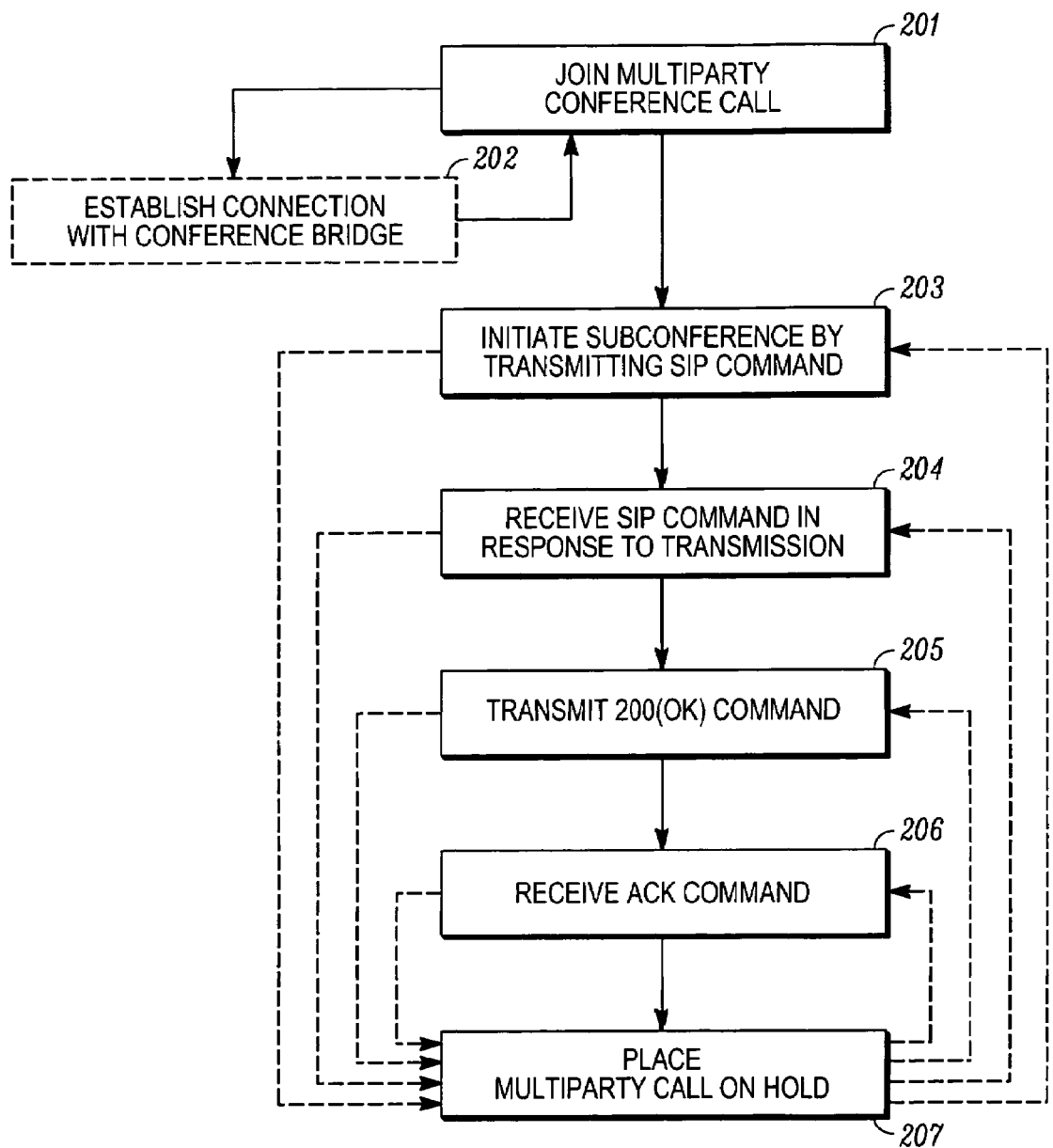
FIG. 2 illustrates one method for establishing a subconference call from a multiparty conference call in accordance with the invention.

Turning now to FIG. 2, illustrated therein is one embodiment of a method for establishing a subconference call from a multiparty conference call in accordance with the invention. At step 201, a user joins the multiparty call with at least a first party and a second party as was illustrated in FIG. 1. As noted above, one suitable method for facilitating the multiparty conference call is by establishing a telecommunication connection with a conference bridge, as is shown at step 202. Regardless of the method used for the multiparty conference call, however, the multiparty conference call includes a unique conference identifier as was described above.

At step 203, the user initiates a direct telecommunication with one of the first party and the second party by transmitting at least one SIP command. In one embodiment of the invention, the SIP command used to establish the subconference is selected from the group consisting of a REFER command and an INVITE command. The use of the REFER command will be described first, followed by the use of the INVITE command.

Turning briefly to FIG. 3, illustrated therein is one exemplary embodiment of the structure of a REFER command 300 in accordance with the invention. The REFER command 300 is a data header that contains information pertinent to a recipient's processing of the command. The REFER command 300 includes at least one data field 301 indicating from whom the command, and thus the direct telecommunication, was referred. As noted above, this field is populated with the conference identifier.

The REFER command 300 may also include other data and fields. For example, another data field 302 may indicate an identity of a target party to whom the REFER command 300 is to be transmitted. Another data field 303 may indicate an originating party from whom the REFER command 300 was sent. Yet another data field 304 may indicate a method by which the recipient may accept the REFER command 300. In this embodiment, the REFER command 300 may be accepted by transmission of an INVITE command as is indicated by data field 304.

Optionally, the REFER command 300 may include a data body 305. The data body 305 may be populated with information relating to the subconference call. For example, the data body 305 may include information telling the recipient that the call is to be an audio call as opposed to a video call. The data body 305 may inform the recipient what type of CODEC was used in the transmission, or what type of technology is supported by the hardware making the transmission.

Turning now back to FIG. 2, where the recipient accepts the REFER command sent at step 203, an INVITE command is received at step 204 in response to the transmission of the REFER command. Upon receipt of the INVITE command, the originating party knows that the target party is interested in engaging in the subconference call. To complete the call, the originating party first transmits a 200(OK) command in response to receiving the INVITE command at step 205. The recipient then sends an ACK command in return. As such, the originating party receives an ACK command in response to transmitting the 200(OK) command at step 206. Note that other transmissions, for example a brief data transmission indicating that the REFER command may be transmitted as well. Such incidental transmissions will be clear to those of ordinary skill in the art having the benefit of this disclosure and are therefore not recited in exhaustive detail here.

At step 207, both the parties engaging in the subconference call place the multiparty conference call on hold. Note that this step is optional, as the parties engaging in the subconference call may listen to both calls concurrently if so desired. Also, this step 208 may be done anywhere in the method, as is indicated by the dashed lines in FIG. 2. It is sometimes desirable to place the multiparty conference call on hold just prior to beginning the subconference call, so as to miss only a minimal amount of the multiparty call.

Note that this method may take place between the parties without ever announcing their desire to do so to the multiparty group. In other words, two parties can conduct a subconference call by sending SIP commands without the need to make an audible announcement to the group regarding their intentions. Additionally, as the conference identifier is listed in the SIP commands as the party from whom the subconference request was referred, the parties' handsets are able to distinguish between incoming requests that relate to the multiparty call, and those that are extraneous.

Figure 4:
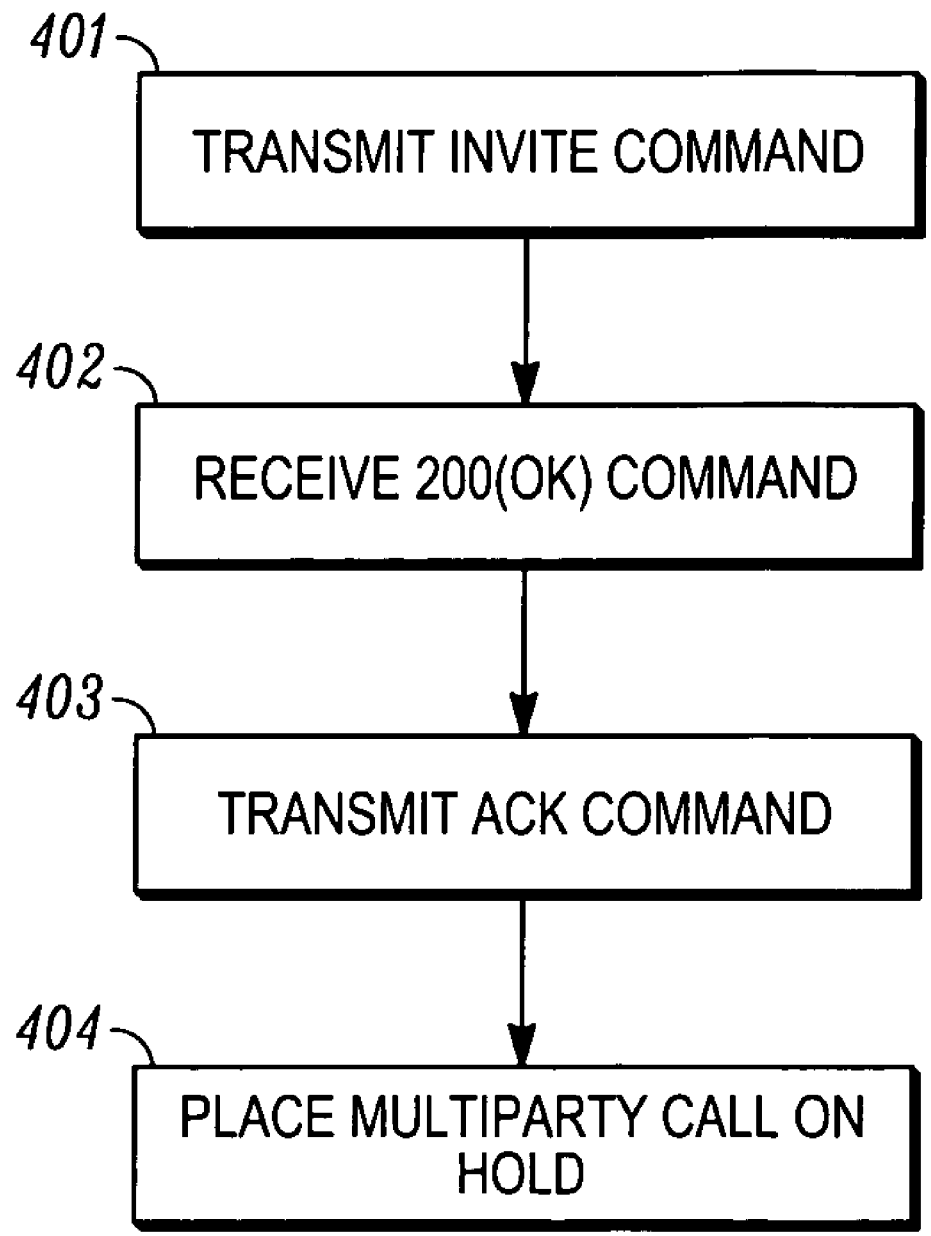
FIG. 4 illustrates another method for establishing a subconference call from a multiparty conference call in accordance with the invention.

Turning now to FIG. 4, illustrated therein is an alternate embodiment for initiating and conducting a subconference call from a multiparty call in accordance with the invention. In FIG. 4, rather than transmitting a REFER command to initiate the subconference call, the originating party transmits an INVITE command at step 401.

Turning briefly to FIG. 5, illustrated therein is one exemplary embodiment of an INVITE command 500 in accordance with the invention. As with the REFER command, the INVITE command includes a data field 501 indicating from whom the direct telecommunication was referred. That data field 501 indicates that the conference identifier referred the INVITE command 500, thereby allowing the recipient to distinguish conference related calls from extraneous calls.

The INVITE command 500 also includes a data field 502 indicating the identity of a target party to whom the INVITE command 500 is to be transmitted. Another data field 503 indicates the originating party from whom the INVITE command 500 was sent. Another data field 504 indicates possible responses to the INVITE command. Additionally, a data body 505 may include characteristics of the originating party's call that assist the recipient in establishing an efficient subconference call.

Turning now back to FIG. 4, presuming that the target party is interested in participating in the subconference call, the originating party receives a 200(OK) command in response to transmitting the INVITE command at step 402. At step 403, the originating party transmits an ACK command in response to receiving the 200(OK) command. At step 404, the multiparty call is placed on hold. As with FIG. 2, the step of placing the multiparty call on hold may take place at various times in the method, and need not necessarily occur last.

Figure 6:
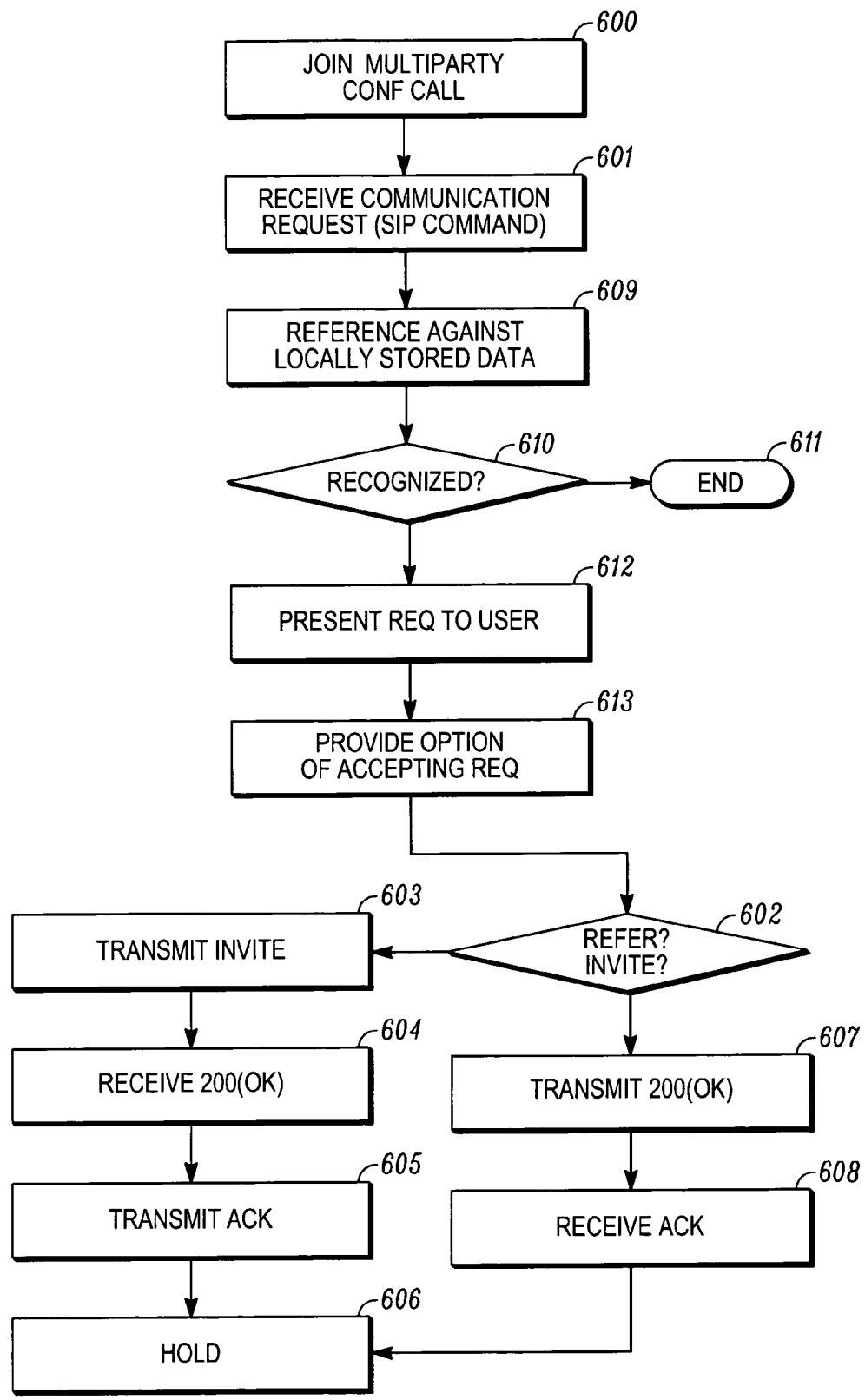
FIG. 6 illustrates one embodiment for establishing a call in parallel with a multiparty conference call in accordance with the invention.

Turning now to FIG. 6, illustrated therein is a method of establishing a call in parallel with a multiparty call as viewed by a recipient of an initial invitation in accordance with the invention. The method begins when the party joins the multiparty conference call at step 600. Since FIG. 6 is the recipient's perspective, a direct telecommunication request is received from another party in the multiparty conference call at step 601. This direct telecommunication request may either be a REFER command or INVITE command. Regardless of whether the received command was a REFER or INVITE, the received command will include a data field indicating from whom the command was referred, and, as above, the referring entity will be the conference identifier.

As an optional step, to provide a more seamless interface to the user, the recipient's handset may reference the conference identifier against a locally stored list of conference participants at step 609. For example, when a user subscribes to a special conference package, his handset may record the identifiers of the conference and all of the participants upon joining the multiparty call. Where this is the case, to distinguish conference-related calls from extraneous ones, the handset may read any of the data fields upon receipt of a communication request. The handset may read the conference identifier to determine if it is the referring entity. The handset may also read the sender's identity to see if they are presently participating in the conference.

Continuing with the example of the handset reading the conference identifier, the handset determines whether the conference identifier is recognized at decision 610. Where the conference identifier is recognized, the handset may optionally present the communication request to a user at step 612. The handset may further provide the user the option of accepting the request at step 613. Where the conference identifier or sender is not recognized, the handset may reject the call by ending the loop at step 611.

The recipient's handset then determines which SIP command was received, REFER or INVITE, at decision 602. Where the received command is a REFER command, the recipient (presuming that he wants to participate in the subconference call) will transmit an INVITE command at step 603 in response to receiving the REFER command. The recipient will then receive a 200(OK) command at step 604 in response to transmitting the INVITE command. The recipient will then transmit an ACK command at step 605 in response to receiving the 200(OK) command. Now that the subconference call can be established, the recipient places the call on hold at step 606.

Where the received command is an INVITE command, the recipient transmits a 200(OK) command at step 607. The recipient then receives an ACK command at step 608.

Figure 7:
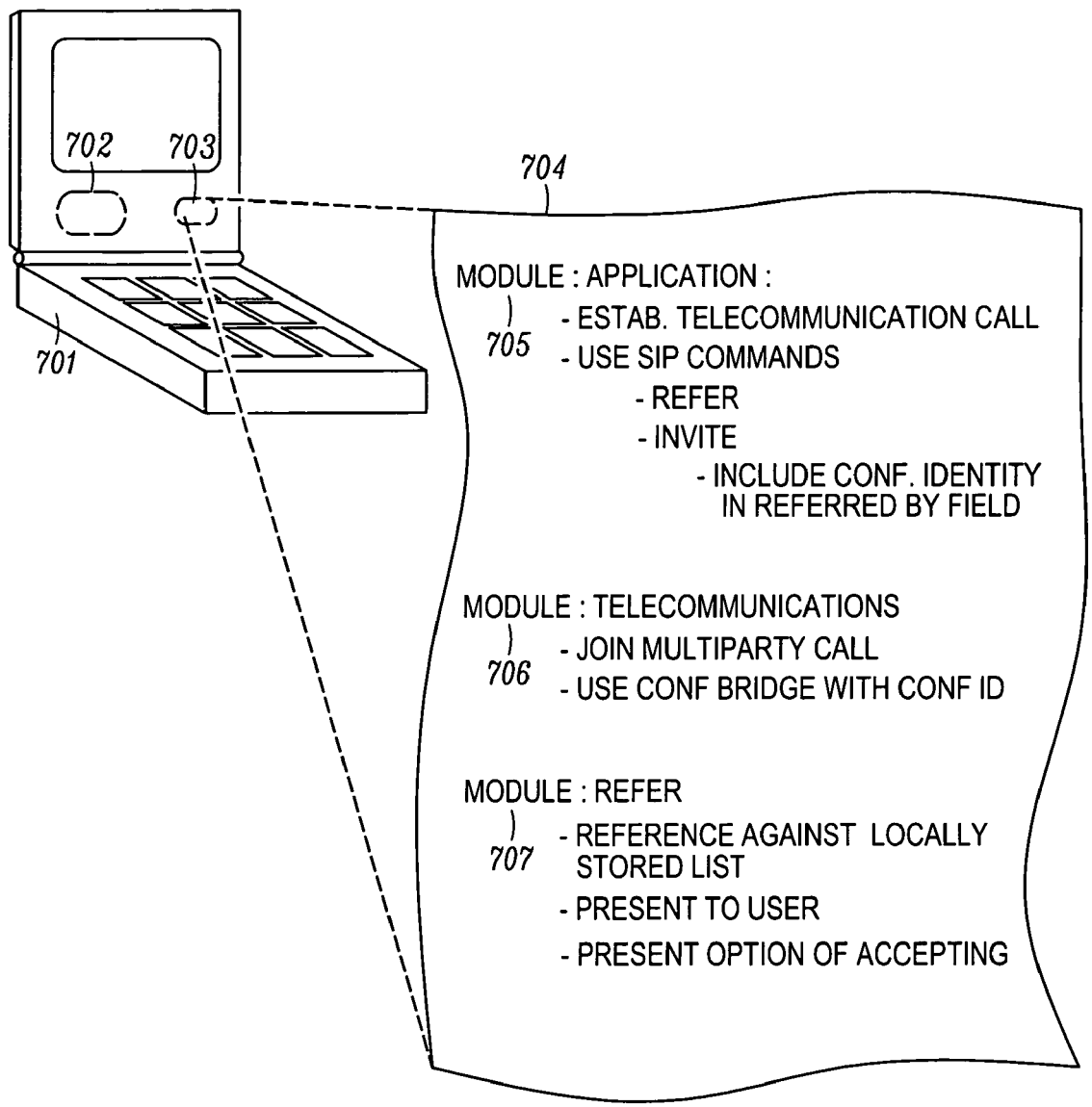
FIG. 7 illustrates an apparatus capable of establishing a subconference call in parallel with a multiparty call in accordance with the invention.

Turning now to FIG. 7, illustrated therein is an apparatus capable of establishing a subconference call in parallel with a multiparty conference call in accordance with the invention. In one embodiment, a radiotelephone 701 includes a central processor 702 and associated memory 703. The central processor 702 is capable of executing firmware commands stored in the memory 703 so as to functionally operate the radiotelephone 701.

The memory 703 stores modules capable of directing the central processor 702 as to what commands to execute. An application module 705, operable with the central processor 702, is capable of establishing telephonic communications by way of transmission and receipt of SIP commands. A telecommunication module 706, operable with the central processor 702, is capable of joining a multiparty conference call with at least two other parties by way of a conference bridge having a conference identifier.

In one embodiment, the application module 705 initiates the subconference call by transmitting a SIP command. The SIP command may either be an INVITE command that includes at least one data field indicating that the conference identifier referred the INVITE command, or it may be a REFER command having at least one data field indicating that the conference identifier referred the REFER command.

Another module, the reference module 707 that is operable with the central processor 702, references a locally stored list of call participants from the data fields in the SIP command, be they the conference identifier or identifiers of the respective participants. The reference module 707 may also present the incoming call request or conference identifier to the user where it is recognized, and may further present the user with an option of accepting the request.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendancy of this application and all equivalents of those claims as issued.

What is claimed is:

1. A method of establishing a subconference call from a multiparty conference call, the method comprising the steps of:
   a. joining the multiparty conference call with at least a first party and a second party, the multiparty conference call having a conference identifier; and
   b. initiating a direct telecommunication with one of the at least a first party and a second party by transmitting at least one session initiation protocol command, wherein the session initiation protocol command comprises a REFER command including at least three data fields, wherein the at least three data fields comprise:
   a first data field indicating an identity of a target party to whom the session initiation protocol REFER command is to be transmitted;
   a second data field indicating an originating party from whom the session initiation protocol REFER command was sent including the conference identifier; and
   a third data field indicating a method by which a recipient may accept the session initiation protocol REFER command;
   wherein the session initiation protocol REFER command comprises a data body, wherein the data body comprises information relating to characteristics of the subconference call.

2. The method of claim 1, wherein the step of establishing the multiparty conference call comprises establishing a telecommunication connection with a conference bridge.

3. The method of claim 1, further comprising the step of receiving a session initiation protocol INVITE command in response to transmitting the session initiation protocol REFER command.

4. The method of claim 3, further comprising the step of transmitting a session initiation protocol 200 (OK) command in response to receiving the session initiation protocol INVITE command.

5. The method of claim 4, further comprising the step of receiving a session initiation protocol ACK command in response to transmitting the session initiation protocol 200 (OK) command.

6. The method of claim 1 further comprising the step of placing the multiparty conference call on hold.

7. A method of establishing a call in parallel with a multiparty conference call, the method comprising the steps of:
   a. joining the multiparty conference call with at least a first party and a second party, the multiparty conference call having a conference identifier; and
   b. receiving a direct telecommunication initiation request from one of the at least a first party and a second party comprising at least one session initiation protocol command, wherein the session initiation protocol command comprises a REFER command including at least three data fields, wherein the at least three data fields comprise:
   a first data field indicating an identity of a target party to whom the session initiation protocol REFER command is to be transmitted;
   a second data field indicating an originating party from whom the session initiation protocol REFER command was sent including the conference identifier; and
   a third data field indicating a method by which a recipient may accept the session initiation protocol REFER command;
   wherein the session initiation protocol REFER command comprises a data body, wherein the data body comprises information relating to characteristics of the subconference call.

8. The method of claim 7, further comprising the step of transmitting a session initiation protocol INVITE command in response to receiving the session initiation protocol REFER command.

9. The method of claim 8, further comprising the steps of receiving a session initiation protocol 200 (OK) command in response to transmitting the session initiation protocol INVITE command, and the step of transmitting a session initiation protocol ACK command in response to receiving the session initiation protocol 200 (OK) command.

10. The method of claim 7, wherein the conference identifier is referenced against a locally stored list of conference participants.

11. The method of claim 7, further comprising the step of referencing the conference identifier with an identification of a conference bridge hosting the multiparty teleconference.

12. An apparatus capable of establishing a subconference call in parallel with a multiparty conference call, comprising:
   a. a radiotelephone having a central processor and associated memory;
   b. an application module operable with the central processor, the application module being capable of establishing multiparty telephonic communications by way of a session initiation protocol command; and
   c. a telecommunication module operable with the central processor capable of joining the multiparty conference call by way of a conference bridge with at least two other parties, the conference bridge having at least a conference identifier;
   wherein the application module is configured to initiate the subconference call during the multiparty conference call by transmitting a session initiation protocol REFER command including at least three data fields, wherein the at least three data fields comprise: a first data field indicating an identity of a target party to whom the session initiation protocol REFER command is to be transmitted; a second data field indicating an originating party from whom the session initiation protocol REFER command was sent including the conference identifier; and a third data field indicating a method by which a recipient may accept the session initiation protocol REFER command;
   wherein the session initiation protocol REFER command comprises a data body. wherein the data body comprises information relating to characteristics of the subconference call.

13. The apparatus of claim 12, further comprising a reference module operable with the central processor, wherein the reference module:
   a. references a locally stored list of call participants from the conference identifier;
   b. presents the conference identifier to a user; and
   c. provides an option of accepting the subconference call to the user.

* * * * *